(12) United States Patent
Duale et al.

(10) Patent No.: US 9,111,034 B2
(45) Date of Patent: Aug. 18, 2015

(54) TESTING OF RUN-TIME INSTRUMENTATION

(71) Applicant: International Business Machines Corporation, Armonk, NY (US)

(72) Inventors: Ali Y. Duale, Poughkeepsie, NY (US); Shailesh R. Gami, Poughkeepsie, NY (US); Sandhya Venugopala, Bangalore (IN); Dennis Wittig, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 13/778,996

(22) Filed: Feb. 27, 2013

(65) Prior Publication Data

US 2014/0245074 A1 Aug. 28, 2014

(51) Int. Cl.
*G06F 11/00* (2006.01)
*G06F 11/36* (2006.01)

(52) U.S. Cl.
CPC .................................. *G06F 11/3644* (2013.01)

(58) Field of Classification Search
USPC ................................. 714/38.1, 45, 35; 703/22
See application file for complete search history.

(56) References Cited

U.S. PATENT DOCUMENTS

| | | | |
|---|---|---|---|
| 2006/0075305 A1* | 4/2006 | Robinson et al. | 714/38 |
| 2009/0144742 A1 | 6/2009 | Subhraveti et al. | |
| 2009/0282289 A1* | 11/2009 | Nori et al. | 714/38 |
| 2010/0251031 A1 | 9/2010 | Nieh et al. | |
| 2010/0281303 A1* | 11/2010 | Cates | 714/33 |
| 2011/0083044 A1* | 4/2011 | Ghosh | 714/38.1 |
| 2012/0011491 A1* | 1/2012 | Eldar | 717/130 |
| 2012/0101800 A1* | 4/2012 | Miao et al. | 703/22 |

OTHER PUBLICATIONS z/Architecture Principles of Operation, SA22-7832-08, tenth edition (Sep. 2012) 1568 pages, attached in 4 parts.

* cited by examiner

*Primary Examiner* — Yolanda L Wilson
(74) *Attorney, Agent, or Firm* — Cantor Colburn LLP; Steven Chiu

(57) ABSTRACT

A computer program product is provided for performing a method including: generating a test instruction stream of a program that includes a plurality of executable instructions; setting controls for a runtime-instrumentation process; simulating execution of the test instruction stream and sampling of the test instruction stream according to the controls, and storing simulated records associated with the sampling in a predicted collection buffer (PCB); accessing a program buffer of a processor, the program buffer storing records associated with sampling the test instruction stream according to the controls during execution of the test instruction stream by the processor; examining individual records in the program buffer to determine whether the individual records are valid and in proper sequence; and comparing the simulated records of the PCB and the records of the program buffer to validate the program buffer.

20 Claims, 9 Drawing Sheets

FIG. 5

| Record No. | Record Type(s) | Section |
|---|---|---|
| 0 | Begin, Timestamp | Header |
| 1 | Emit, TX Abort, Call, Return, Branch, Filter | Body |
| 2 | | |
| 3 | | |
| $R_{RG}-R_{NC}(=4)$ | | |
| $R_{RG}-R_{NC}(=5)$ | Extra, Model-Dependent | Extra |
| $R_{RG}-2 (=6)$ | | |
| $R_{RG}-1$ | Instruction | Footer |

110
112 — Header
114 — Body
116 — Extra
118 — Footer

FIG. 8

Count1 = 3
Count2 = 2

MACHINE RUNTIME INSTRUMENTATION PROGRAM BUFFER

```
           |------PBrecord1------|               |------PBrecord2------|
022C9000   02000003012000000 3537C45D29467680    0000000000000000 0000000000000000
           |------PBrecord3------|               |------PBrecord4------|
022C9020   0000000000000000 0000000000000000     04000000217A89C E3C0AFD200000000  ┐ 1st
           |------PBrecord5------|               |------PBrecord6------|           ├ Interruption
022C9040   0300000001000000 3537C45D29C2B440     1400000000217A8BF 00000000217A8CC ┘ Point
           |------PBrecord7------|               |------PBrecord8------|
022C9060   0000000000000000 0000000000000000     0400000000217A8D0 B9076EF000000000
           |------PBrecord9------|               |------PBrecord10-----|
022C9080   0300000001000000 3537C45D29C2E440     1400000000217A8BF 00000000217A8CC ┐ 2nd
           |------PBrecord11-----|               |------PBrecord12-----|           ├ Interruption
022C90A0   0000000000000000 0000000000000000     0400000000217A8DE E33099B01000000 ┘ Point
```
82

INTERNAL PREDICTED COLLECTION BUFFER

```
           |-------CBrecord1--------|             |-------CBrecord2--------|
01F08000   1400000000217A8BF 00000000217A8CC      0400000000217A8D0 B9076EF400000000
           |-------CBrecord3--------|
01F08020   0400000000217A8DE E33099B100000000     0000000000000000 0000000000000000
```
126

TESTING OF RUN-TIME INSTRUMENTATION

BACKGROUND

The present invention relates generally to processing within a computing environment, and more specifically, to collected events using run-time instrumentation.

Computer processors execute transactions using increasingly complex branch prediction and instruction caching logic. These processes have been introduced to increase instruction throughput, and therefore processing performance. The introduction of logic for improving performance makes it difficult to predict with certainty how a particular software application will execute on the computer processor. During the software development process there is often a balance between functionality and performance. Software is executed at one or more levels of abstraction from the underlying hardware that is executing the software. When hardware is virtualized, an additional layer of abstraction is introduced. With the introduction of performance enhancing logic, and the various layers of abstraction it is difficult to precisely predict what is actually occurring at the hardware level when a program is executing. Without this information, software developers use more abstract methods, such as execution duration, memory usage, number of threads, etc., for optimizing the software application.

Runtime Instrumentation (RI) is designed to provide information that can be used in optimizing program execution functions, such as certain just-in-time software compilation scenarios and other program-optimizing processes. The intention is to provide information that can be used in fine tuning applications. Specific information in instrumented instruction streams can be very useful when subsequent analysis is performed.

SUMMARY

Embodiments include a computer program product for system-level testing of a run-time instrumentation sampling process. The computer program product includes a tangible storage medium readable by a processing circuit and storing instructions for execution by the processing circuit for performing a method. The method includes: generating a test instruction stream of a program that includes a plurality of executable instructions; setting controls for a runtime-instrumentation process, the runtime-instrumentation process configured to sample one or more instructions as the test instruction stream is executed and store records of events corresponding to the one or more sample instructions; simulating execution of the test instruction stream and sampling of the test instruction stream according to the controls, and storing simulated records associated with the sampling in a predicted collection buffer (PCB); accessing a program buffer of a processor, the program buffer storing records associated with sampling the test instruction stream according to the controls during execution of the test instruction stream by the processor; examining individual records in the program buffer to determine whether the individual records are valid and in proper sequence; and comparing the simulated records of the PCB and the records of the program buffer to validate the program buffer.

Other embodiments include a computer implemented method for system-level testing of a run-time instrumentation sampling process. The method includes: generating a test instruction stream of a program that includes a plurality of instructions configured to be executed by a processor; setting controls for a runtime-instrumentation process, the runtime-instrumentation process configured to sample one or more instructions as the test instruction stream is executed and store records of events corresponding to the one or more sample instructions; simulating execution of the test instruction stream and simulating sampling of the test instruction stream according to the controls by a test system, and storing simulated records associated with the simulated sampling in a predicted collection buffer (PCB); accessing a program buffer of a processor, the program buffer storing records associated with sampling the test instruction stream according to the controls during execution of the test instruction stream by the processor; examining, by the test system, individual records in the program buffer to determine whether the individual records are valid and in proper sequence; and comparing, by the test system, the simulated records of the PCB and the records of the program buffer to validate the program buffer.

Still other embodiments include a system for system-level testing of a run-time instrumentation sampling process that includes a memory and a processor including a testing unit. The testing unit is configured to perform: generating a test instruction stream of a program that includes a plurality of executable instructions; setting controls for a runtime-instrumentation process, the runtime-instrumentation process configured to sample one or more instructions as the test instruction stream is executed and store records of events corresponding to the one or more sample instructions; simulating execution of the test instruction stream and sampling of the test instruction stream according to the controls, and storing simulated records associated with the sampling in a predicted collection buffer; accessing a program buffer of a processor, the program buffer storing records associated with sampling the test instruction stream according to the controls during execution of the test instruction stream by the processor; examining individual records in the program buffer to determine whether the individual records are valid and in proper sequence; and comparing the simulated records of the PCB and the records of the program buffer to validate the program buffer.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 depicts an exemplary reporting group in accordance with an embodiment;

FIG. 8 illustrates an example of the contents of a program buffer generated by a run-time instrumentation process and the contents of a predicted collection buffer generated by the method of FIG. 6.

DETAILED DESCRIPTION

There are provided methods, apparatuses and computer program products for testing or validating instruction sampling, collecting and/or monitoring functions. An example of such a function is a run-time Instrumentation (RI) facility that performs sampling of collected processor events during program execution to allow for performance analysis. The RI facility may be used in a laboratory or test set-up, or in customer environments during program run-time under program control on a processor (CPU). RI includes sampling machine behavior/events in response to an instruction stream (i.e., a sequence of instructions fetched and executed to run a program) at configurable intervals. At each sample point, data in the form of records representing events is collected during program execution into one or more collection buffers within the CPU and then reported to a program buffer. An additional buffer such as an instrumentation-data buffer may be used to store execution information.

The RI facility is tested by building an instruction stream and post-processing the program buffer at selected points during and/or after execution of the instruction stream. An instruction stream may be a pre-selected set of instructions to be executed or a pseudo-random instruction stream that represents one or more execution scenarios. In one embodiment, the program buffer is validated by examining samples (also referred to as reporting groups) collected in the program buffer.

In one embodiment, the program buffer is validated by comparison with a buffer, referred to as a predicted collection buffer, that is constructed by a test system. The predicted collection buffer is constructed during prediction of the instruction stream by collecting records representing events occurring during execution. The predicted records include both event records and instruction records expected to be collected by the RI facility. The program buffer records are considered to be a subset of predicted records of the predicted collection buffer, since a RI machine may be allowed to skip samples and records. The program buffer and the predicted collection buffer are compared to determine whether the correct samples have been stored in the program buffer and whether the program buffer includes any records not predicted by the test system.

Figure 1:
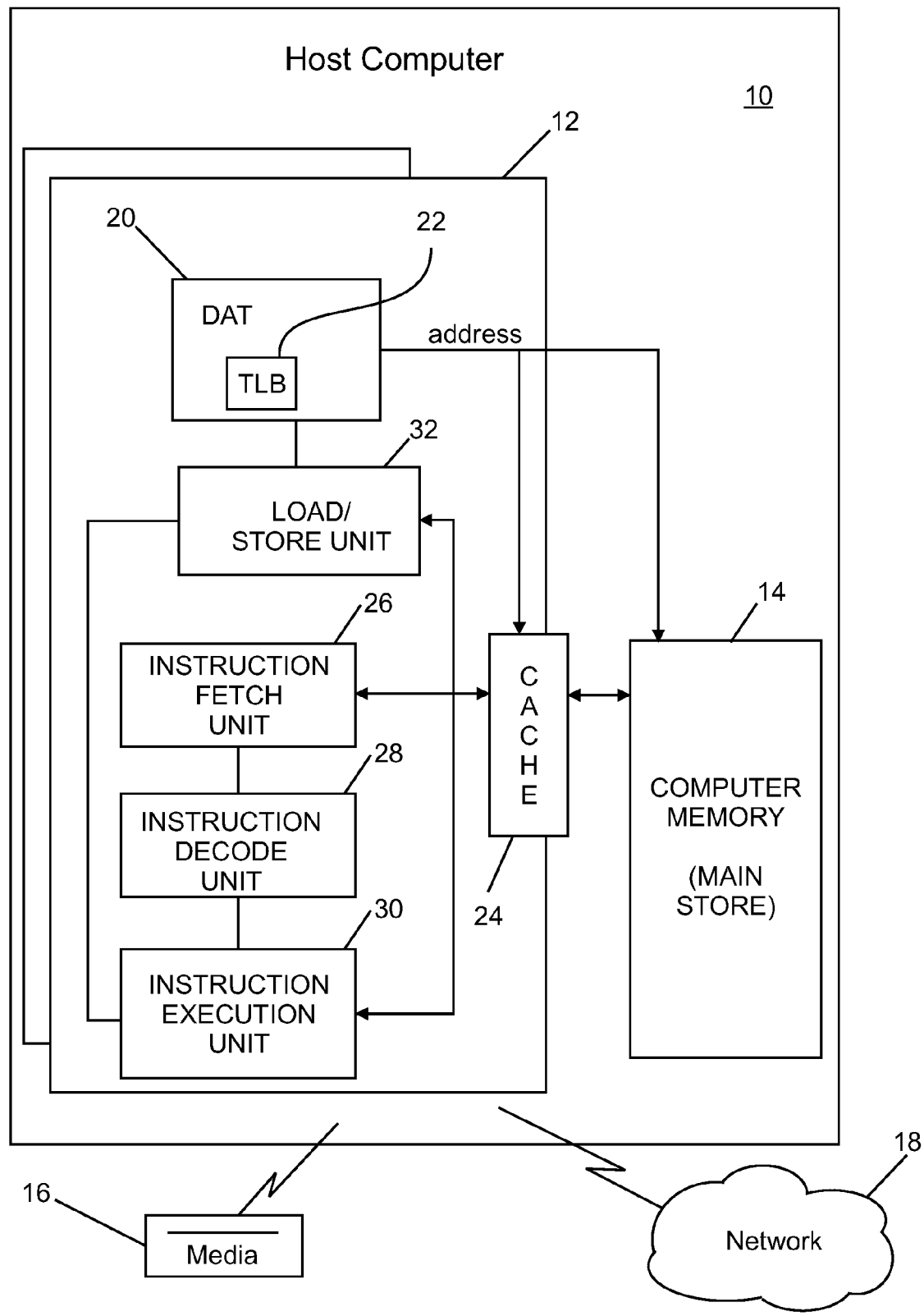
FIG. 1 is a diagram depicting an example host computer system in an embodiment.

FIG. 1 depicts an embodiment of a host computer system 10. The host computer system 10 includes one or more processors 12 in communication with main store (computer memory) 14 and I/O interfaces to storage devices 16 and/or networks 18 for communicating with other computers or SANs and the like. For example, the host computer system 10 may communicate with other computers or networks by way of a network adapter capable of communicating with the network 18. Alternatively, the host computer system 10 may communicate using a wireless interface, such as a cellular digital packet data (CDPD) card. The host computer system 10 may be associated with such other computers in a local area network (LAN) or a wide area network (WAN). In addition the host computer system 10 may be a host or client in a client/server arrangement with another computer.

In one embodiment, the processor 12 is compliant with an architecture having an architected instruction set and architected functionality. The processor 12 may include dynamic address translation (DAT) 20 for transforming program addresses (virtual addresses) into real addresses, and typically includes a translation lookaside buffer (TLB) 22. One or more caches 24 may be employed between the computer memory 14 and the processor 12. In one embodiment, an instruction is fetched from the computer memory 14 by an instruction fetch unit 26 via the cache 24, decoded in an instruction decode unit 28 and dispatched to an instruction execution unit 30. Any number of execution units 30 may be employed, such as an arithmetic execution unit, a floating point execution unit and a branch instruction execution unit. The instruction is executed by the instruction execution unit 30, accessing operands from instruction specified registers or the computer memory 14 as needed. If an operand is to be accessed (loaded or stored) from the computer memory 14, a load store unit 32 typically handles the access under control of the instruction being executed. Instructions may be executed in hardware circuits or in internal microcode (firmware) or by a combination of both.

In one embodiment, the host computer system includes or is in communication with an emulated computer system. The emulated host computer system may include an emulated host processor (or virtual host processor) and a native processor having a native instruction set architecture. The emulated host computer system has memory accessible to the native processor. The native processor executes native instructions of an architected instruction set. Other facilities that are defined for a host computer system architecture may be emulated by architected facilities routines, including such facilities as general purpose registers, control registers, dynamic address translation and input/output (I/O) subsystem support and processor cache for example. The native processor typically executes emulation software that is responsible for fetching and executing instructions of the emulated processor architecture. The emulation software maintains the architecture rules of the emulated processor architecture so as to assure operating systems and applications written for the emulated processor operate correctly.

In a mainframe, architected machine instructions are used by programmers, often by way of a compiler application. These instructions stored in the storage medium may be executed natively in a z/Architecture IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a Z/Architecture®, Linux can be used as well as machines which use emulation by Hercules, UMX, Fundamental Software, Inc. (FSI) or Platform Solutions, Inc. (PSI), where generally execution is in an emulation mode.

One or more of the components of the host computer system 10 and/or the emulated host computer system are further described in "IBM® z/Architecture Principles of Operation," Publication No. SA22-7832-08, 10th Edition, (September 2012) which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2:
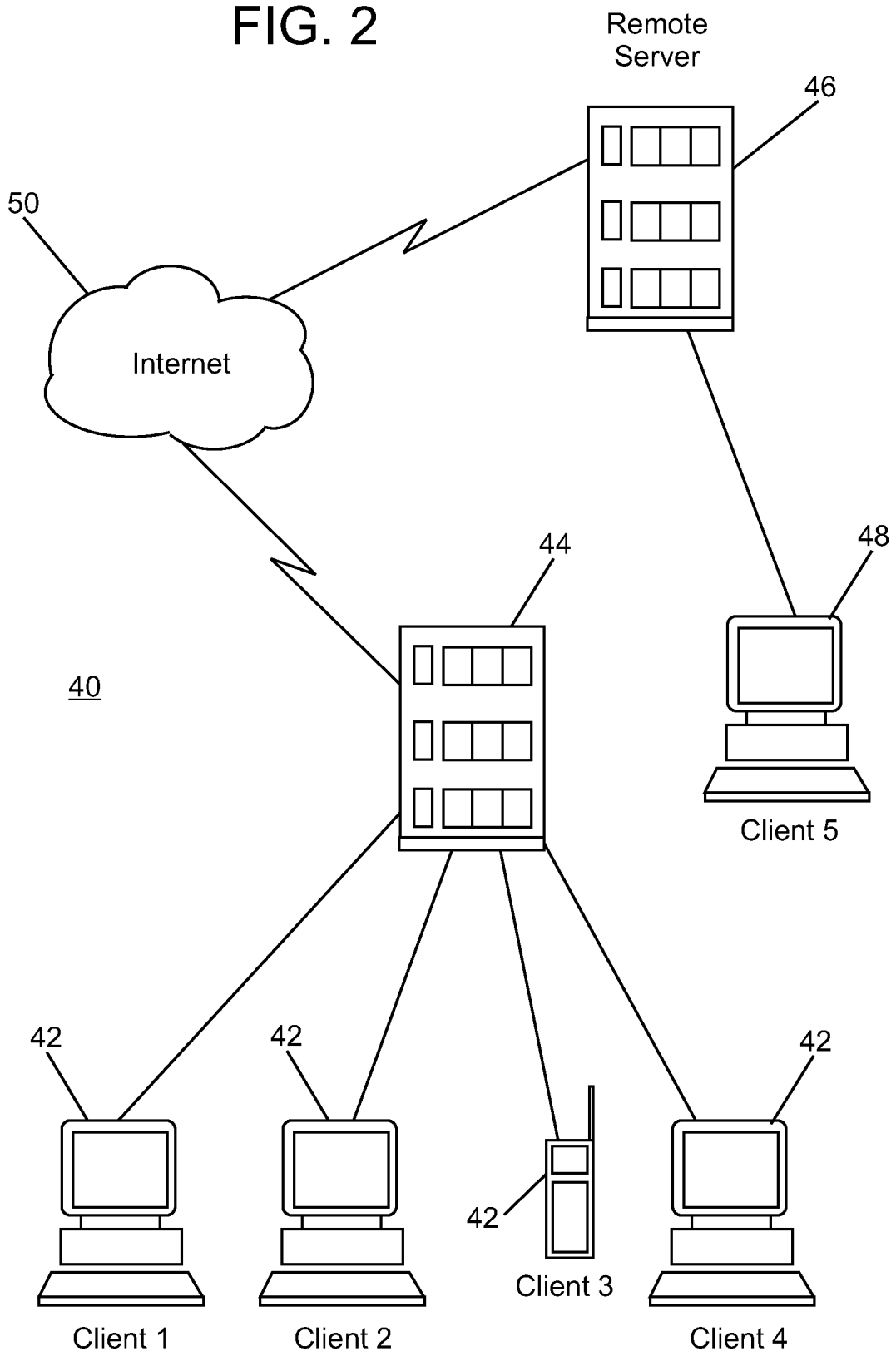
FIG. 2 is a diagram depicting an example computer network in an embodiment.

FIG. 2 illustrates a data processing network 40 in which the embodiments described herein may be practiced. The data processing network 40 may include one or more individual networks, such as a wireless network and a wired network, each of which may include a plurality of individual workstations 42 and/or the host computer system 10. Additionally, as those skilled in the art will appreciate, one or more LANs may be included, where a LAN may include a plurality of intelligent workstations coupled to a host processor.

In one example, the network 40 may include mainframe computers or servers, such as a gateway computer (client server) 44 or application server (remote server) 46 which may access a data repository and may also be accessed directly from a workstation 48. A gateway computer 44 serves as a point of entry into the internet 50 or other larger network. The gateway computer may be implemented utilizing an IBM eServer™ zSeries® z9®, Server available from International Business Machines Corporation.

In one embodiment, the host computer system 10 or other processors (such as the servers 44, 46) are incorporated as a node in a cloud computing environment. Exemplary networks utilize cloud networks using a model such as a Software as a Service (SaaS), Platform as a Service (PaaS) or Infrastructure as a Service (IaaS) model. In exemplary embodiments, the system 10 executes various applications, such as a node hypervisor and multiple virtual machines.

When executing a program, a processor (e.g., processor 12) fetches an instruction from an instruction register according to a program counter. The program counter keeps track of the address of the current instruction to be executed. In one embodiment, the program counter is typically embodied in a program status word (PSW) specified in the z/Architecture. The program counter in the PSW for a program is used while the program instructions are being executed, and the PSW of the program maintains the program counter value while the program is not active. In an embodiment, the program counter is incremented by an amount equal to the number of bytes of the current instruction. Reduced Instruction Set Computing (RISC) instructions are typically fixed length while Complex Instruction Set Computing (CISC) instructions are typically variable length. Instructions of the IBM z/Architecture are CISC instructions having a length of 2, 4 or 6 bytes. The program counter is modified, for example, by either a context switch operation or a branch taken operation of a branch instruction.

The PSW may include a program counter of the next instruction to be executed, a condition code field usable by branch instructions, an instrumentation control field for indicating whether instrumentation is enabled or disabled, and other information used to control instruction sequencing and to determine the state of the computer processor including the privilege state assigned to the program. In a multithreaded processing environment, multiple programs share, or time slice, the available computer processor capacity. Each of the programs has context information including an associated PSW, an origin address of an address translation table for accessing main storage assigned to the program, a set of general purpose register current values, control registers, floating point registers, etc. The currently active, or controlling PSW, is called the current PSW and governs the program currently being executed. In one embodiment, the computer processor has an interruption capability, which permits the computer processor to context switch rapidly to another program in response to exception conditions and external stimuli.

For example, referring again to FIG. 1, an instruction fetch unit 26 is employed to fetch instruction(s) on behalf of the processor 12. The instruction fetch unit 26 either fetches the next sequential instruction (NSI), the target instructions of branch taken instructions, or the first instructions of a program following a context switch. The fetched instruction(s) are then executed by the processor 12. In an embodiment, the fetched instruction(s) are passed to a decode unit 28, which decodes the instruction(s) and forwards information about the decoded instruction(s) to appropriate execution units 30. The execution units 30 perform arithmetic operations on operands according to the operation code (opcode) of the instruction. Operands are provided to the execution unit 30 either from the memory 14, architected registers, or from an immediate field of the instruction being executed. Results of the execution, when stored, are stored either in memory 14, architected registers or in other machine hardware (such as control registers, PSW registers and the like).

A program in progress, having a program counter value, may be interrupted by, for example, the operating system (i.e., the current context switches from the program environment to the operating system environment). The execution of a group of instructions may be interrupted for a variety of reasons including a context switch initiated by an operating system, a program exception or error causing a context switch, an I/O interruption signal causing a context switch or multi-threading activity of a plurality of programs (in a multi-threaded environment) for example.

In a context switch operation, the current program counter value is saved in the PSW along with other state information about the program being executed (such as condition codes), and a new program counter value is loaded pointing to an instruction of a new program module to be executed. The computer processor places the current PSW in an assigned storage location, called the old-PSW location, for the particular class of interruption. The computer processor fetches a new PSW from a second assigned storage location. When the computer processor has finished processing the interruption, the program handling the interruption may reload the old context including the old PSW, making it again the current PSW, so that the interrupted program can continue.

Instrumentation data is data related to the operations of the processor 12. In an embodiment, access to instrumentation data and other system level metrics may be restricted, or unavailable. A computer processor operates under a privileged state (or supervisor state), and a lesser-privileged state (or problem state). In the privileged state, a program may have access to all system resources via privileged operations (e.g., access to all control registers and the supervisor memory space). An operating system executing on the computer processor may be operating in the privileged state. The lesser-privileged state is a non-privileged state where access to system resources is limited. The PSW is typically not write accessible to a program executing in the lesser-privileged state.

Runtime Instrumentation (RI) is designed to access such instrumentation data and provide information that can be used in optimizing certain just-in-time software compilation scenarios and other program-optimizing processes. In one embodiment, a RI facility is incorporated in various processing or computing systems that execute instructions, e.g., on models implementing z/Architecture. When the RI facility is installed and enabled, data is collected during program execution into one or more collection buffers within the processor and then reported to a program buffer. Each unit of information stored is called a reporting group. The contents of a reporting group consist of multiple records whose contents represent events recognized by the CPU during program execution.

In an embodiment, by manipulating the context, an operating system controls computer processing resources, including enabling run-time instrumentation by the computer processor. The RI facility may be enabled or disabled during the execution of the operating system, as well as by any software applications executed by the operating system. The enabled/disabled state of RI is saved as context information in the PSW associated with a program.

The RI facility includes a number of instructions for controlling the RI facility and controlling sampling of instructions by the RI facility. Exemplary instructions are described as follows. The load runtime-instrumentation controls (LRIC) instruction initializes the runtime-instrumentation controls that govern runtime-instrumentation. The modify runtime-instrumentation controls (MRIC) instruction modifies a subset of the runtime-instrumentation controls originally established by LRIC. The runtime-instrumentation emit (RIEMIT) instruction collects the value of a general register by storing it into a collection buffer. The runtime-instrumentation next (RINEXT) instruction performs directed sampling of the next, sequential instruction (NSI) after RINEXT. The runtime-instrumentation off (RIOFF) and runtime-instrumentation on (RION) instructions disable and enable runtime-instrumentation, respectively. The store run-time-instrumentation controls (STRIC) instruction places the current values of the runtime-instrumentation controls into a specified storage location. The test runtime-instrumentation controls (TRIC) instruction examines the runtime-instrumentation controls. If valid, the state of a controls-altered indicator is set.

Figure 3:
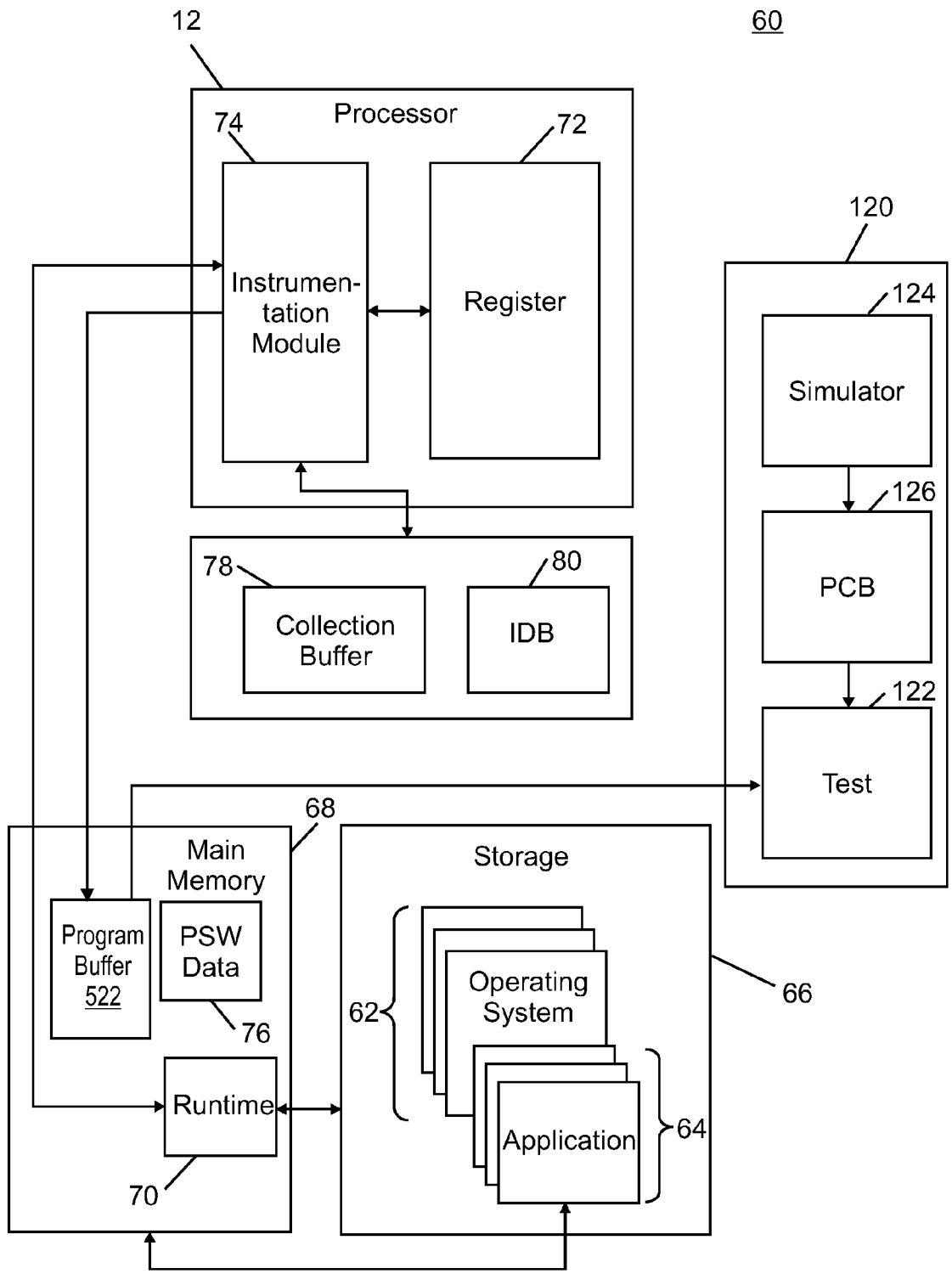
FIG. 3 depicts a schematic diagram of a system for run-time instrumentation of a processor in accordance with an embodiment.

FIG. 3 depicts a schematic diagram of an exemplary system 60 for run-time-instrumentation (RI) of a processor that may be implemented in an embodiment. In an embodiment, the system 60 includes a central processing unit (CPU) such as the processor 12 of FIG. 1. The processor 12 may be a single processor or a single processing core of a multi-core processor. The processor 12 executes one or more operating systems 62 and one or more applications 64, which are stored in a storage 66, such as a hard drive, CD/ROM, flash memory, etc. and are loaded into a main memory 68 in a runtime memory area 70. In one embodiment, each of the operating systems may execute as a virtual machine managed by a hypervisor (not shown) and executed by the processor 12.

In one embodiment, the processor 12 includes at least one register 72. The register 72 may be a hardware register capable of storing words of data for use by the processor 12. The register may include one or more latches for storing bits of data that are accessible by the processor 12. Exemplary registers include general purpose registers and control registers.

The processor 12 may include an instrumentation module 74 that is in communication with the register 72. The instrumentation module 74 is a processing circuit that controls the instrumentation of the processor 12, e.g., executes a runtime-instrumentation facility. The instrumentation module 74 is configured to collect instrumentation data, such as the execution path of one or more taken branches, transactional execution abort events, various runtime operands and timestamp information, directly from the processor 12. In one embodiment, each of the one or more operating systems 62 and or the one or more applications 64 may execute an instruction to trigger the instrumentation module 74 to start or stop collecting instrumentation data.

When executing a program, the processor 12 loads a PSW for a program in the register 72 from a memory region such as a PSW data area 76 in the main memory 68 and sets one or more processor settings in, for example, the register 72. In an embodiment, the PSW in the register 72 includes one or more bits for enabling and controlling the instrumentation module 74. The processor 12 then executes each instruction in an instruction stream specified by a PSW instruction address. Sequencing of instructions may be controlled using sequencing information provided by the PSW. In addition, the PSW may also include bits used to inhibit or permit interrupts.

During runtime-instrumentation, the instrumentation module 74 collects instrumentation data from the processor 12 as a result of instruction stream execution, and stores the instrumentation data in a collection buffer 78. The collection buffer 78 is used to capture a set of records whose contents report on events recognized by the processor during program execution. In one embodiment, the processor 12 includes an instruction-data buffer (IDB) 80 that captures model-dependent data of sample instructions at sample points. The instruction-data buffer collects data from an instruction in anticipation of being available when the instruction is identified as a sample instruction.

The collection buffer 78 may be located in the processor and, in one embodiment, is implemented as an array of register pairs for storing an instruction address and event metadata for a given event. An example of an event is a taken branch for which the register pair may hold the instruction address of the branch, and the metadata may hold the target of the branch as well as information regarding the historic behavior of the branch. In an embodiment, the registers pairs are ordered and updated sequentially as events occur in the instruction stream. A counter is maintained to indicate the index of the most recently updated entry in the array. In an embodiment the collection buffer 78 is a circular buffer, and when the collection buffer 78 is full, the next event overwrites the first entry in the array, and sequential updating of the array's register pairs re-starts on subsequent events.

Events that represent a state of the processor 12 at any given execution point (e.g., instruction data and event metadata) are thus captured sequentially in the collection buffer 78. In one embodiment, the events recognized depend on runtime-instrumentation controls embodied in, for example, a control block such as a runtime-instrumentation controls control block (RICCB) shown in FIG. 4. Examples of event metadata include, but are not limited to: the instruction address of a taken branch and its target including some information about the historic behavior of the branch; the instruction address of a RIEMIT instruction and a respective register value; and the address of a transaction execution (TX) abort instruction and a respective transaction recovery entry point.

An embodiment of the collection buffer 78 stores up to thirty-two entries (i.e., information about thirty-two events; this number can easily change from one implementation or version of architecture to another), with each instruction address specified by sixty-four bits (e.g., bits 0:63), and event metadata by sixty-four bits (e.g., bits 64:127). The size of the collection buffer ($R_{CB}$) is a model dependent count, representing a number of records. In an embodiment, the byte size of the collection buffer 78 is a multiple of a sixteen byte record size. The size of the collection buffer ($R_{CB}$) is a number of records greater than or equal to the difference between the count of the largest reporting group ($R_{RG}$) and the count of the records in a reporting group that are not acquired from the collection buffer ($R_{NC}$). Thus, in an embodiment, the size of the collection buffer is expressed as: $R_{CB} \geq (R_{RG} - R_{NC})$.

The instrumentation module 74 is configured to sample instructions from an instruction stream and report instrumentation data related to the sampled instructions to a program buffer 82 in main memory 68. Instructions that are sampled are referred to herein as "sample instructions." For example, when an application 64 executes an instruction that has been determined to be a sample instruction, a sample point is created at the completion of execution of the sample instruction that causes the instrumentation module 74 to move the application's collected data from the collection buffer 78 to the program buffer 82.

In one embodiment, the collected data related to each sample instruction is configured as a set of records that is sent to the program buffer 82 as a reporting group. The reporting group includes information such as a time-stamp record, an instruction record and other event records for recording various events. Examples of such events are: execution of one or more taken branches, TX abort events, instruction-fetch cache misses, data fetch or store cache misses, and an operand of a RIEMIT instruction. Additional data can be collected and/or stored in other buffers, such as the instruction-data buffer 80.

Record types that may be captured in the reporting group store include: filler, extra, begin, timestamp, and instruction records. A filler record is used in a reporting group when the number of valid records in the collection buffer is not sufficient to fill a reporting group of the current reporting-group size. An extra record may be used in the extra section of a reporting group. A begin record is the first record of the first reporting group stored for an instruction stream or program. A timestamp record is stored as record 0 of every reporting group other than the first reporting group. An instruction record is created as the last record of a reporting group when the reporting group is stored for a sample instruction.

Other record types that can be captured include various event records such as emit, TX mode abort, call, return, and transfer records. An emit record is created by successful execution of RIEMIT. A TX mode abort record is created by either an implicit abort or by execution of a transaction abort instruction. A call record is created by execution of a branch instruction which is categorized as a call-type branch instruction. A return record is created by execution of a return-type branch instruction which is categorized as a return instruction. A transfer record is created by execution of a branch instruction which meets certain condition code criteria.

Instructions may be sampled according to one or more modes. For example, instructions can be sampled according to cycle count and/or instruction count, each of which determine an approximate interval which is subject to an amount of variability based on internal system events and exception conditions. In the cycle-count mode, a count is the number of CPU cycles, which can be adjusted responsive to an event associated with the sampling mode. For example, the count may be decremented when the processor 12 is in the operating state. When the count is decremented to a threshold value, such as zero, the current instruction is recognized as a sample instruction, and the count is reinitialized to a starting value and begins to be decremented with the next cycle.

In instruction-count mode, a count may be specified by RI controls. For example, for an instruction which consists of a single unit of operation, the count is decremented at the completion of the instruction as an event used to adjust the count. The instruction is a sample instruction when the count is decremented to a threshold value, such as zero.

In directed-sampling mode, directed sampling occurs when a RINEXT instruction is executed successfully. The sample instruction is the next, sequential instruction (NSI) in the instruction stream after the RINEXT instruction. Directed sampling may occur when in the cycle-count or instruction-count mode. Whatever the sampling mode is, when a sample instruction is identified by execution of the RINEXT instruction, a reporting group is stored.

Sampling, regardless of the mode, identifies a sample instruction. Once a sample instruction is identified, collection stops upon completion of execution of the sample instruction and reporting to the program buffer 82 begins. The various reporting controls that govern reporting then apply. Collection resumes when store of the reporting group is made pending.

Reporting is subject to reporting controls. When a sample instruction is identified, each reporting control enables the checking of a corresponding condition. If a corresponding condition exists, a reporting group is formed and stored. A reporting group is not stored when no reporting control is enabled or the corresponding condition does not exist for an enabled reporting control.

To configure run-time instrumentation controls, in one embodiment, the processor 12 supports a load run-time instrumentation controls (LRIC) instruction. Beyond the specific LRIC fields described further herein, it will be understood that additional fields can be defined to support other functionality. The LRIC instruction can be used to load and initially configure run-time instrumentation and is supported by the instrumentation module 74. A current state of run-time instrumentation controls can be stored from register 72 into main memory 68 using the store run-time controls (STRIC) instruction.

Controls may be stored from the LRIC instruction as a control block or other data format. For example, controls can be set by a run-time-instrumentation controls control block (RICCB). Exemplary controls include control of storing reporting groups in response to interruptions and fetch protection. The RICCB may be utilized as an operand of an LRIC instruction for initialization of controls, and may also be utilized for modification of controls (e.g., by a MRIC instruction).

Figure 4:
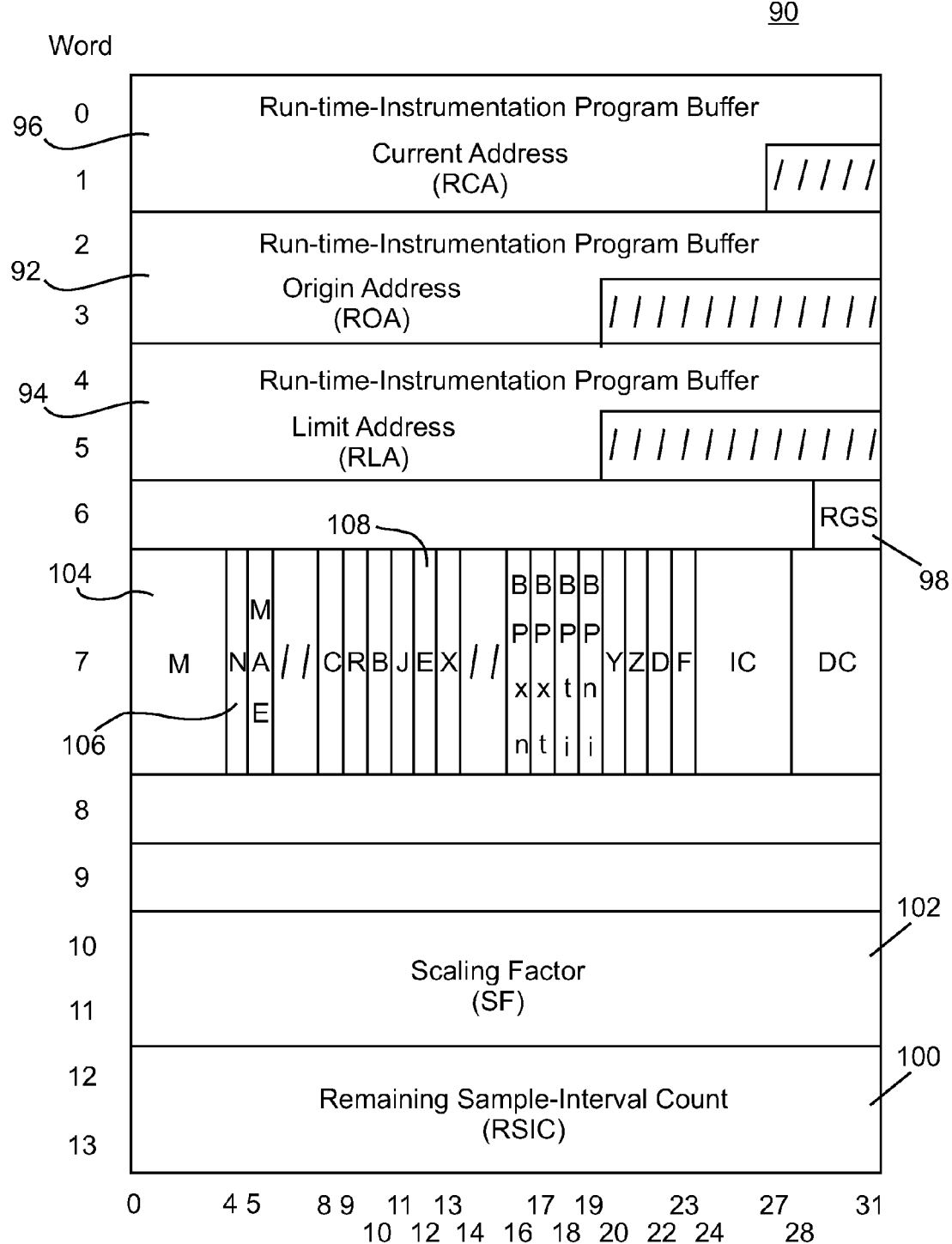
FIG. 4 depicts a portion of an exemplary run-time-instrumentation controls control block.
Figure 6:
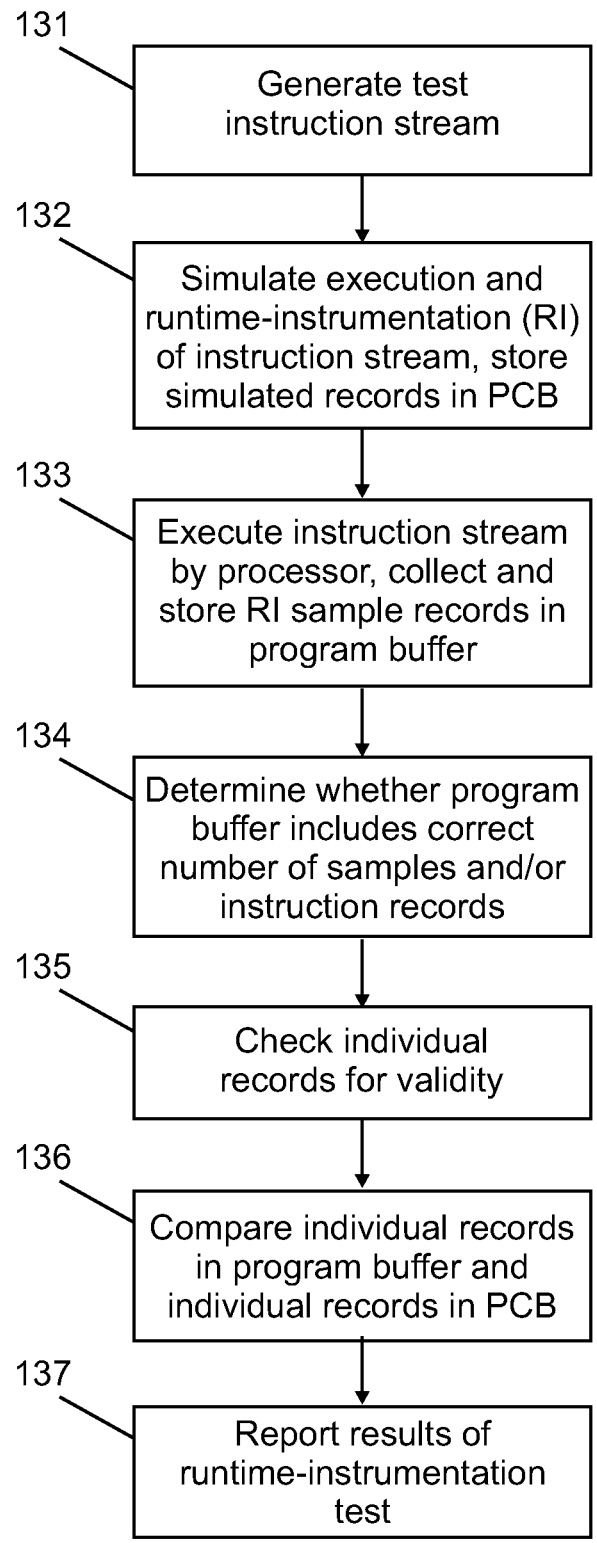
FIG. 6 is a flow diagram depicting an exemplary embodiment of a method of analyzing the performance and validity of a run-time instrumentation process.

FIG. 4 depicts a portion of an exemplary RICCB control block 90. It is noted that this control block is merely exemplary; any type of control structure or architecture may be used to provide controls. The RICCB 90 includes a run-time-instrumentation program-buffer origin address (ROA) 92 that indicates the location of the first byte of the program buffer 82, and a run-time-instrumentation program-buffer limit address (RLA) 94 that indicates the location of the last byte of the program buffer 82. A run-time-instrumentation program buffer current address (RCA) 96 indicates the location in the program buffer 82 of a next reporting group to be stored, and may be updated by the MRIC instruction.

A remaining sample interval count (RSIC) field 100 indicates a remaining sample interval count. When the value of the RSIC field 100 in the run-time-instrumentation controls is zero or equal to the value in a scaling factor (SF) field 102, and run-time-instrumentation is enabled, then the next sample interval is a full interval based on the sampling mode. When the RSIC field 100 is nonzero and less than the SF field 102, the next sample interval is a partial interval. When the RSIC field 100 is nonzero and greater than the SF field 102, the next sample interval is an extended interval. When an extended interval expires, the next interval is based on the SF field 102 value.

The RICCB 90 includes various additional control fields, examples of which are described below. A mode (M) field 104 is a 4-bit unsigned integer whose value in the run-time-instrumentation controls specifies the sampling mode. A RINEXT control bit 106 (N bit) controls enablement of the RINEXT instruction. When the N bit 106 is zero or ignored and treated as zero, RINEXT executes a no-operation. When the N bit 106 is one, and not otherwise ignored, RINEXT is enabled to execute its defined function. A RIEMIT instruction control bit 108 (E bit) controls the execution of the RIEMIT instruction.

The reporting group size (RGS) field 98 is a 3-bit unsigned integer whose value specifies the number of records of a reporting group ($R_{RG}$). The number of records in a reporting group may vary from two records, including a begin/timestamp record and an instruction last record, up to two hundred fifty-six records. In an embodiment, the upper limit may be model dependent. The number of 16-byte records placed into a reporting group is $2^{(RGS+1)}$.

The above fields and bits of FIG. 4 are an example of the placement and naming of the fields and are provided herein for purposes of clarity. It will be understood that in other embodiments the only a subset of the fields may be used, fields may be in any order or position, and/or may be signified by different names.

FIG. 5 depicts a high-level example of a reporting group 110 that may be stored to the program buffer 82 at a sample point. The number of records in the reporting group 110 is represented by $R_{RG}$ and equals $2^{(RGS+1)}$, where RGS is the reporting group size as an exponent. A model-dependent number of records ($R_{NC}$) copied from a location other than the collection buffer 78 may or may not be copied non-destructively when used in a reporting group. In the example of FIG. 5, $R_{RG}=8$, $R_{GS}=2$, and $R_{NC}=4$. The exemplary reporting group 110 includes a header section 112, a body section 114, an extra records section 116, and a footer section 118. It is noted that this reporting group is merely exemplary; any type of data structure or architecture may be used to communication and/or record execution events and records.

The header section 112 may include a begin record or a timestamp record to hold status, tracking, and/or timing information. A begin record is stored in the header section 112 for the first reporting group stored in a program buffer (i.e., when the RCA 96 is equal to the ROA 92). In an embodiment, the begin record includes a record type field of "02", a number of reporting groups (NRG) field for indicating how many reporting groups are currently stored in the program buffer, a RGS field to indicate the size of the reporting groups, a stopped (S) field for indicating whether or not the program buffer 82 is full, a halted (H) field for indicting whether the run-time instrumentation is halted, and a time of day (TOD) clock field for indicating when the begin record was written. In an embodiment, at least a subset of the fields in the begin record are sourced from the RI control block (e.g., RICCB). An embodiment of the timestamp record has a record type of "03" and includes a TOD clock field for indicating when the record was stored. In an embodiment, a timestamp record is stored in the header section 112 for each reporting group other than the first reporting group.

The body section 114 of the reporting group may include a variety of records for events and information sampled from collection buffer 78. Exemplary records include emit instruction, TX mode abort, call, return, branch and filler records. An emit record (type field "10") is created and stored in the collection buffer 78 upon a successful execution of a RIEMIT instruction. A TX mode abort record (type field of "11") is created and stored in the collection buffer 78 by either an implicit abort or by execution of a transaction abort instruction. A call record (type field of "12") is created by execution of a call type branch instruction. Return records (type field of "13") and transfer records (type field of "14") are created by execution of return type branch instructions.

A filler record may be used in the reporting group 110 when the number of valid records in the collection buffer 78 is not sufficient to fill the reporting group having a current RGS. An embodiment of a filler record includes record type field of "00" to indicate that the record is a filler record and the remaining bytes are undefined.

The extra records section 116, when present, may contain model-dependent records. In an embodiment, the format of an extra record is similar to the filler record except for the record type is set to "01" to indicate that the record is an extra record and the remaining bytes of the extra record may contain model dependent data.

The footer section 118 can include an instruction record containing information about execution of a sample instruction. An instruction record is created when a reporting group is stored for a sample instruction. An embodiment of the instruction record includes a record type field of "04", an instruction address code field to indicate how the instruction address bit positions of the current PSW are represented in the instruction record, an instruction address field which varies depending on the addressing mode (e.g., 64, 31 or 24 bit) and contains the instruction address of the sample instruction or execute type instruction if the sample instruction was the target of an execute type instruction, and an instruction-data buffer (IDB) field containing any model dependent data collected from the IDB.

Referring again to FIG. 3, a test system 120 is provided for checking the operation of an RI facility (e.g., executed by the instrumentation module 74) and validating the RI facility by checking the contents of a program buffer such as the program buffer 82. The test system 120 may be embodied as part of the processor 12 or incorporated in a separate processor and connected via, e.g., network communication lines. The test system 120 includes and a testing unit 122 that is configured to inspect and analyze the contents of the program buffer 82. In one embodiment, the test system 120 includes a simulator 124 that is configured to simulate execution of a selected instruction stream, and store information regarding the results of the simulated execution. For example, a Predicted Collection Buffer (PCB) 126 is used by the simulator 124 to store simulation information. The testing unit 122 may compare the contents of the PCB 1126 and the program buffer 82 to determine whether the contents of the program buffer 82 are valid.

Figure 9:
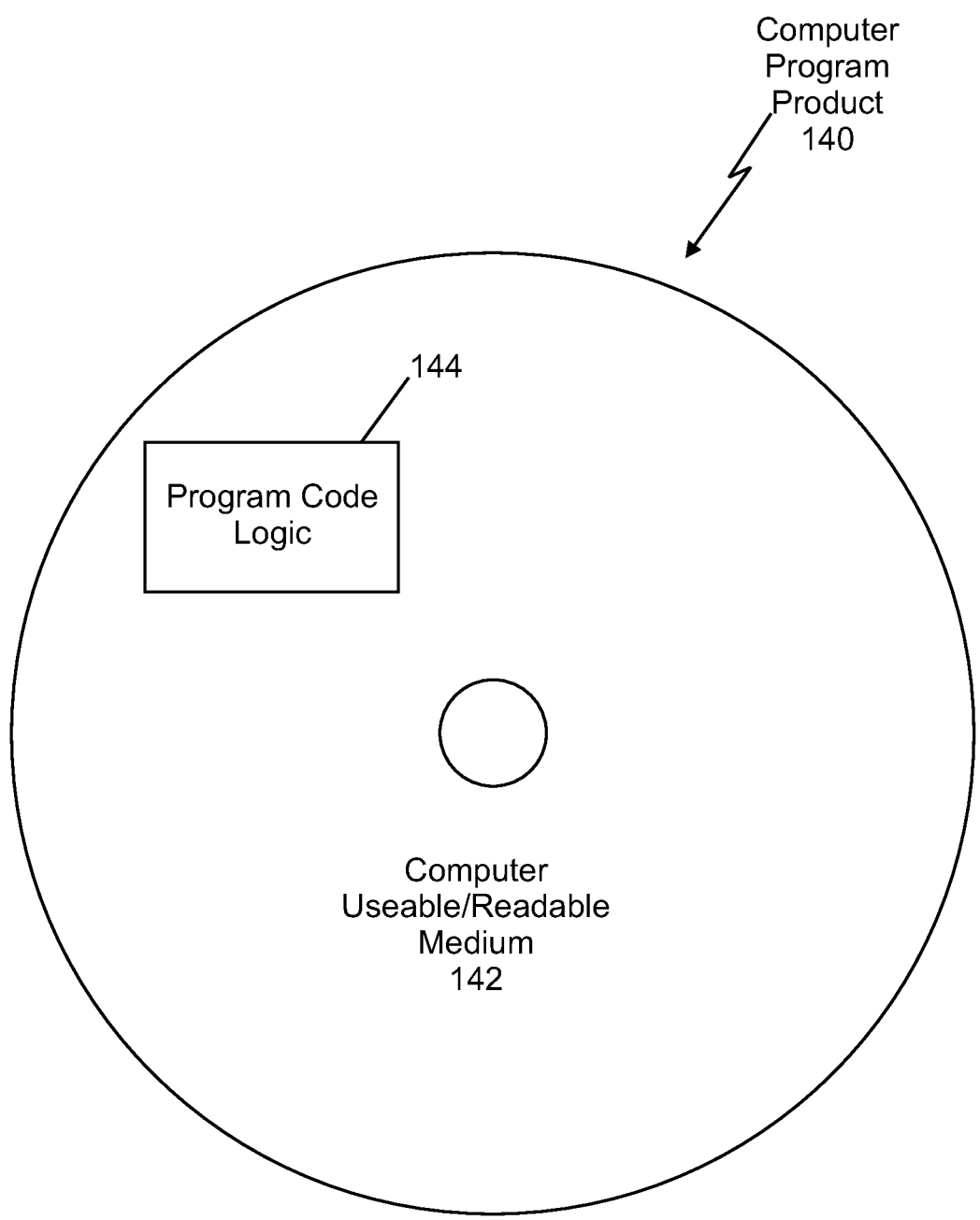
FIG. 9 illustrates a computer program product in accordance with an embodiment.

FIG. 9 is a process flowchart depicting an embodiment of a method 130 for testing a runtime instrumentation facility. The method includes a number of process steps or stages represented by blocks 131-137. The method 130 is described in conjunction with the processor 12 and the test system 120, but is not so limited. The method 130 may be performed by one or more processors or other devices in a computing and/or network environment that is capable of executing and/or monitoring execution of program instructions. In one embodiment, the method 130 includes the execution of all of the stages shown in blocks 131-137 in the order described. However, certain stages may be omitted, stages may be added, or the order of the stages changed.

At block 131, an instruction stream is generated for execution by a processor, e.g., via the operating system(s) 516 and/or the application(s) 518. In one embodiment, the instruction stream is configured as a test instruction stream that includes a pre-configured or pseudo-random stream of instructions that allow for various scenarios allowed by the system architecture to be tested. The test instruction stream could have a number of interruption points, and in one embodiment, the program buffer 82 is tested and/or validated at each interruption point. However, it is noted that the program buffer 82 may be tested at any selected points (which may be referred to as "testing points") in the instruction stream, which may be pre-determined or selected during execution of the instruction stream by the processor. The test instruction stream build may be dynamic and may generate a variety of record sequences by placing specific instructions that create records in response to the test instruction stream.

For example, in directed sampling, the test instruction stream may include one or more runtime instrumentation instructions (e.g., RINEXT instructions). In another example, for non-directed sampling, the instruction stream is built that enables time and/or instruction count based-sampling; assuring such enablement does not negatively affect the overall instruction stream execution.

At block 132, the instruction stream is simulated, i.e., executed by the simulator 124 of the test system 120. The simulator collects sample data (i.e., predicted sample records) according to selected runtime-instrumentation control settings. The runtime-instrumentation controls are initialized during the simulation and may be modified by the test instruction stream at different points during the simulation.

The predicted sample records are stored in a buffer, such as the PCB 126. The sample records are of fixed size, and in one embodiment, have a format that is the same as the runtime-instrumentation system format and thus have the same format as records that would be generated by the instrumentation module 74 and stored in the program buffer 82. The PCB data may contain a mix of collection buffer records and instruction buffer records created during simulation of the test instruction stream. For example, the simulator 124 generates and stores records including instruction records and event records, and also keeps track of timestamp values related to the records and the instruction stream simulation. The collection buffer and instruction buffer records in the PCB are recorded in ascending order of the events occurring during test instruction stream simulation with latest events recorded at the end and oldest at the beginning of PCB.

The data collected by the test system 120 is not limited to the above examples. In one embodiment, the test system may collect any information during simulation that can be used to validate the program buffer 82 during execution of the test instruction stream. For example, the number of samples collected at various points in the simulated execution is tracked. In addition, reporting groups (e.g., a reporting group 90) of the same format as that used by the instrumentation module 74 are generated and stored for each instruction sampled during the simulation.

At block 133, the processor retrieves and executes the test instruction stream. During execution of the instruction stream, at selected points during the execution (i.e., sample points), the instrumentation module 74 stores samples in the program buffer 82 according to the runtime-instrumentation controls established above. Sample points may occur at any selected point(s) in the instruction stream, e.g., after a certain time or number of cycles elapses, after a selected number of instructions is executed or when a RINEXT instruction in the instruction stream is executed. The instruction stream may include various runtime-instrumentation instructions that modify runtime-instrumentation controls at one or more points in the instruction stream, and allow the runtime-instrumentation facility to be tested under various conditions to confirm whether the facility is correctly sampling the instruction stream. The records are presented to the user upon a request (which could have different triggers). For example, to request such data, the user can execute specific instruction (e.g., RINEXT), set a time interval and/or set an instruction count to enable data request. In one embodiment, the runtime instrumentation sampling controls are modified as the instruction stream is being executed.

For example, the run-time instrumentation module 74 and register 72 of FIG. 3 are configured to sample instructions according to the sampling mode specified in the RICCB 90. The instructions are sampled periodically and/or sample instructions are reached that trigger storing of a reporting group into the program buffer 82. For examples, at various points during execution of the program, the processor 12 fetches an RINEXT instruction from the instruction stream. If a variety of conditions are met (e.g., runtime-instrumentation is enabled in the PSW and the sampling mode indicated in the M-field is valid), the next sequential instruction (NSI) may be made a sample instruction for causing a run-time instrumentation event. The NSI is executed and the run-time instrumentation event causes a sample or reporting group to be generated from the collection buffer 78 and recorded in the program buffer 82.

Samples are stored by assembling a reporting group (e.g., reporting group 800) for each sampled instruction and sending the reporting group to the program buffer 82. Each reporting group includes a begin or time stamp record and an instruction record, and may include other records such as event records and filler records.

It is noted that the instrumentation module 74 is allowed to skip reporting records or report extra records as expected and these conditions may be accounted for by the test system 120. For example, the instrumentation module 74 is allowed to skip reporting certain records due to certain internal events which the user may be unaware of. The number of skipped records should not exceed a user specified threshold. In certain cases where the instrumentation module 74 may not finish executing an instruction or a group of instructions in one attempt, reporting extra records is allowed.

Blocks 134-136 show exemplary steps for analyzing and/or post-processing the program buffer 82 in order to attempt to validate the data stored in the program buffer 82 and analyze the validity and performance of the runtime-instrumentation facility. These steps check various conditions and can 1) assure that the machine under test did not create more records than possible 2) create a super set of collection records where all the machine reported records (e.g., records stored in the program buffer 82) form a subset of the predicted ones and 3) if operator chooses, allow machine to occasionally drop some samples.

These steps are used to collect information about the runtime-instrumentation process and validate the program buffer 82. Validation can occur at one or more times during instruction execution and/or after completion of execution of the instruction stream. The steps may be performed at each testing point and/or interruption point. It is noted that the validation can be performed at any selected point during execution and performed at any selected validation point in the instruction stream.

The inputs to the post processing routine may include program buffer and PCB data, the length of these buffers, and/or predicted counters. Various additional information is utilized by the test system, such as current sampling mode, mode switching from indirect to direct mode of sampling, number of retries encountered within transactional execution mode, interruptible instructions within the stream and/or instructions involving units of operation.

At block 134, at each interruption point (or other selected point(s) in the instruction stream), the predicted number of accumulated samples (i.e., reporting groups) at the interruption is determined from data collected during simulation, e.g., the number of instruction records stored in the PCB 126 up to the current interruption point, and compared to the number of samples that have been accumulated in the program buffer 82 up to the current interruption point. If the predicted number of samples does not equal the number of samples in the program buffer 82, an error is flagged.

Additional checks are performed, including determining the number of instruction records (e.g., instruction record 808) predicted and comparing the predicted number to the number of instruction records accumulated in the program buffer 82 up to the interruption point.

In one embodiment, the first step in block 134 is determining whether the program buffer 82 should contain any samples or not based on whether the new samples made after last comparison point. If the number of predicted samples collected up to the current interruption point is zero, then the program buffer should be empty else an error will be flagged.

At block 135, individual records in each sample that have been collected by the test system 120 up to the current interruption point are checked to confirm that the records are valid and the correct number of records are stored in the program buffer 82.

For example, the program buffer 82 is checked to confirm that the first record in the program buffer 82 is a begin record (e.g., begin record 802). If the first record is not a begin record, an error is flagged.

The begin record may be checked to make sure that the total number of samples indicated by the begin record up to the current interruption point is the same as the predicted total number of samples. During instruction execution by the instrumentation module 74, in one embodiment, the begin record is updated by replacing the existing begin record with a new begin record when each reporting group is received and the sample is stored. This check of the begin record is provided to confirm that the begin record has been properly updated and indicates the correct number of samples.

There are certain instances where the instrumentation module 74 can drop samples due to some machine internal events. The test system 120 may be unaware of such cases. In such a scenario, it is possible that the instrumentation module 74 skipped storing new samples to the program buffer 82. In this case, the instrumentation module 74 may report old records that could possibly match the new predicted records. This erroneous but false positive is overcome, in one embodiment, by keeping track of the old time stamp (i.e., the time stamp saved prior to the current sample) in the begin record and comparing the total number of samples only when there is a change in time stamp indicating that a new begin record was stored by the runtime-instrumentation machine.

Block 135 may also include validating the correctness of the time stamp record (e.g., time stamp record 802) which is the first record of every sample and the instruction record (e.g., instruction record 808) which is last record of every sample. For a number "n" of samples, there should be n time stamp and instruction records (marking the beginning and end of every sample, respectively).

At block 136, after the above checking is done, the individual records within every sample of the program buffer 82 are validated by using the PCB 126 that was created during simulation (which includes various event records interlaced with instruction records).

In one embodiment, the PCB 126 includes a super set of all possible records that are created during the test system simulation of the test instruction stream, and the program unique buffer records are considered to be a subset of the above super set to allow the test system 120 to skip records when comparing the program buffer 82 and the PCB 126. In certain cases, the module 74 can retry execution of a set of instructions multiple times.

For example, when the PCB 126 includes consecutive instruction record entries without any other type of records or the number of records in the PCB 126 is less than the required number, the program buffer 82 is considered to contain filler records or extra records. Thus, when comparing the buffer records in the program buffer 82, records in the program buffer can be skipped according to the number of filler or extra records predicted by the PCB 126.

At each interruption point (or other selected point in the instruction stream), the records in the PCB 126 are compared to the records in the program buffer 82. Instruction records in each buffer may be considered to mark individual sample points for comparison. In one embodiment, only those records that are stored in the buffers between the current interruption point and a previous interruption point are compared.

In one embodiment, at each interruption point, both the program buffer 82 and the PCB 126 are traversed in reverse direction, starting from the last sample in each buffer and going up to the first sample. The first sample may be, e.g., the first sample in each buffer or the first sample that has been recorded since the previous interruption point. For example, the last instruction record in the PCB 126 marks the starting point of comparison.

The last record in the PCB 126, which should be an instruction record, should match the last record in the program buffer 82. If these records do not match, an error is flagged.

After the last record is checked, both the program buffer 82 and the PCB 126 are decremented by the fixed record size (i.e., record by record) to point to the respective records to be compared. In one embodiment, if filler records or extra records are predicted by the PCB 126, such records are skipped when decrementing the program buffer 82 until a record type (e.g., timestamp, event or instruction record) that is stored by the PCB 126 is encountered. The comparison of these buffers continues until all the collection records are exhausted in all the samples. An error is flagged whenever there is a mismatch in the program buffer record and the expected record in the PCB 126.

In one embodiment, after a comparison between the buffers up to an interruption point, the records in the PCB 126 up to this point are removed or disregarded. Thus, at the next interruption point, the PCB 126 has only records created between the previous interruption point and the current interruption point. The number of samples in the PCB 126 collected up to the current interruption point is used to compare only those samples that are reported in the program buffer 82 up to the current interruption point. All the previously reported samples (i.e., up to previous interruption points) would have already been compared at the previous interruption point(s). Thus, the program buffer 126 is post-processed for correctness at every interruption point until the end of the test stream.

In the block 137, results of the test performed in blocks 134-136 may be reported to a user, other processor or other location. Results may be reported after each interruption point or at the conclusion of the test method. For example, errors may be reported to a user whenever they are encountered or after processing up to an interruption point. In addition, any data or results from any stage of the method 130 may be reported to a user as requested. For example, the contents of the PCB 126 and/or the program buffer 82, as well as other data (e.g., number of records, instructions or samples) may be reported at any time to a user or other processor (e.g., clients 42 or 48).

It is noted that the instruction stream may include cases where runtime instrumentation has not been initially enabled and/or where runtime instrumentation is disabled at some point in the instruction stream. In such cases, the method includes performing the runtime instrumentation and analyzing the program buffer as described above according to whether runtime instrumentation is enabled in the instruction stream.

For example, the instruction stream may include one or more instructions that enable runtime instrumentation (e.g., RION instructions) and/or one or more instructions that disable runtime instrumentation (e.g., RIOFF instructions). In such cases, the method may include validating the program buffer only for those instructions where runtime instrumentation is enabled. (e.g., RIOFF instructions). In such cases, the method may include validating the program buffer only for those instructions where runtime instrumentation is enabled. For example, the method validates the program buffer accordingly to report samples or not even when sample points and collection points exist in the test instruction stream.

The method is effective for various conditions where the runtime instrumentation module or machine has a different number of records than predicted. For example, in some cases, the machine may have fewer records than expected (e.g., samples dropped). In such cases there could be missing samples as well as missing collection records within the reported sample. In case of missing samples, the test method ensures that the number of samples dropped does not exceed a user specified threshold. In case of missing records within the reported sample, the test method ensures that the reported records form a subset of the predicted collection buffer records and also are in the correct sequence as per the timestamp of occurrence (latest records have to be reported). For example, if the reporting group should contain records A, B and C in that order as per the predicted collection buffer, the machine could skip storing all the records (A, B, C), can drop record A while reporting B and C, or can drop A and B while reporting only C. However, in one embodiment, the machine would not report A and C by dropping B or report A and B by dropping C.

In another example, in some cases, the machine may have more records than expected (e.g., interruptible cases). In certain known scenarios, the machine can retry execution of a set of instructions in the instruction stream multiple times, in-turn causing reporting of more records in the sample than expected in the predicted collection buffer (e.g., the Transaction Execution facility). The method described above is able to determine such cases and allow such extra records reported by the machine.

Figure 7:
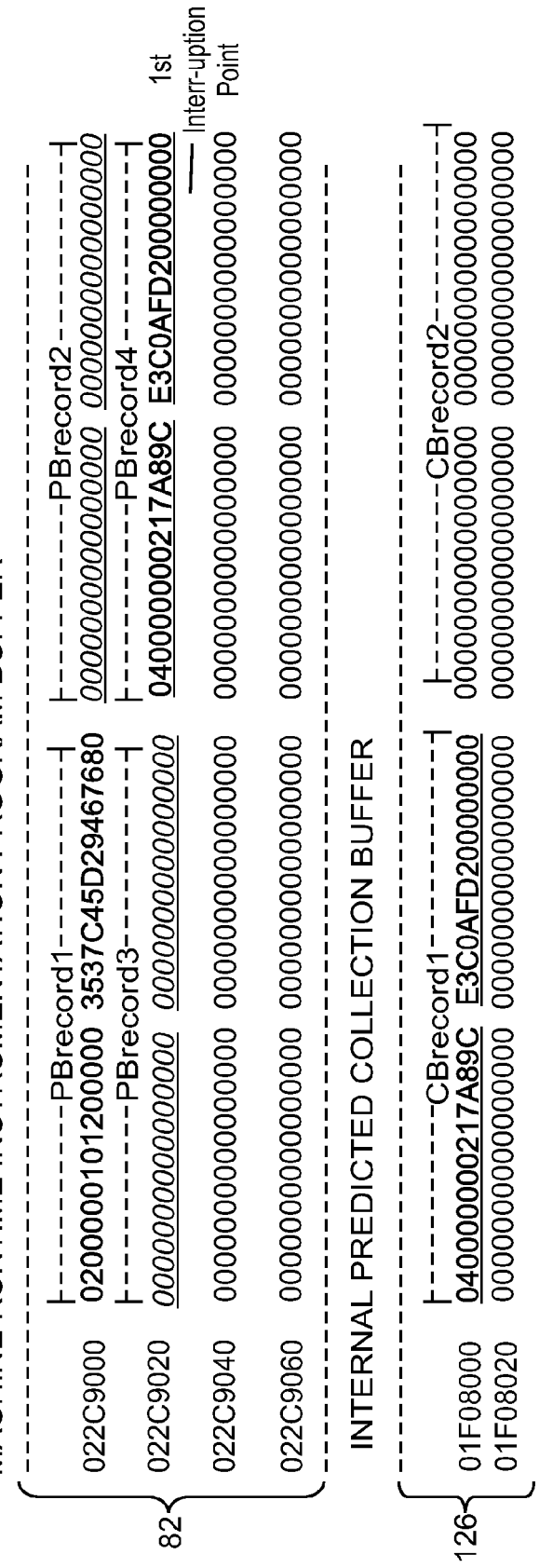
FIG. 7 illustrates an example of the contents of a program buffer generated by a run-time instrumentation process and the contents of a predicted collection buffer generated by the method of FIG. 6.

FIGS. 7 and 8 illustrate an example of the method 130 performed in conjunction with an exemplary test instruction stream. In this example, there are two interruption points. A first interruption point occurs after an initial sample is stored, and a second interruption point occurs after three samples are stored. This example illustrates only the first two interruption points. It is understood that the method is not limited to these specific examples, nor is the method limited to the specific types of records or naming conventions described herein. In addition, the interruption points are exemplary, as any point in the test instruction stream may be used as an interruption point or a testing point, or otherwise used to perform the test method.

In this example, a test instruction stream is simulated by a test system according to selected runtime-instrumentation controls (e.g., established using a RICCB). Interruption points are established in the test instruction stream. The results of the simulation are stored in the PCB 126.

Referring to FIG. 7, the test instruction stream is executed by the processor 12 and runtime-instrumentation is performed by the instrumentation module 74 up to the first interruption point. At this point, the total number of predicted samples ("Count1") is one, and the number of predicted samples ("Count2") collected up to the current interruption point (i.e., between the beginning of the instruction stream or a previous interruption point and the current interruption point) is one. The predetermined number of records predicted to be sourced from the collection buffer ("Rcb") is two. Each record size (depending on RI machine or module configuration) in this example ("Rz") is 16 bytes.

The number of samples in the program buffer 82 is checked. The predicted number of samples (Count2) is one, indicating that there should be one sample in the program buffer 82. In this example, the program buffer 82 does contain a sample. If the program buffer 82 was found to be empty (i.e. containing all zeros), an error would be flagged. But here it is evident that entries exist, so processing continues.

Next, a check is made to see if the first record is a Begin record indicated by "02" in the first byte of the program buffer 82. In this example, the first record "PBrecord1" is a begin record.

A check is made to determine if the number of reporting group spaces (NRG) in the Begin record (PBrecord1) is equal to the predicted total number of samples (Count1). NRG in this example is bytes 2, 3 and 4 of the Begin record. Here, NRG=000001 and Count1=1, so processing continues.

Next, the number of instruction records is checked. Since Count1 is equal to one, there should be one instruction record (indicated by "04" in the first byte) in the program buffer 82. Here, "PBrecord4" is an instruction record. The very first sample in the program buffer 82 will not have a timestamp record (instead has a begin record) and hence not checked now.

After that all the initial checks are done, internal predicted collection buffer (PCB) 126 is used to validate all the records stored in the sample of the program buffer 82. The last record "CBrecord1" in the PCB 126 is checked, which in this case is the only record and is an instruction type record. CBrecord1 corresponds with the last record in the program buffer 82 which is denoted as "PBrecord4".

It is noted that the number of non-instruction type records in the PCB 126 is zero, which is less than the predetermined number of records to be sourced from the collection buffer (Rcb=2 in this case). This indicates that there should be two filler or extra type records in the program buffer. A filler record is indicated by "00" in the first byte and an extra record is indicated by "01" in the first byte. Here, "PBrecord2" and "PBrecord3" are filler type records.

Comparison of both the buffers commences starting with the last record first, i.e. PBrecord4 of the program buffer 82 and CBrecord1 of the PCB 126. Here, both the records are equal. The buffer pointers are then decremented by record size (Rz=16 bytes). Since it is predetermined as shown above that the next two records in the program buffer should be filler records, they are verified (PBrecord3 and PBrecord2 are filler records) and only the program buffer pointer is decremented each time. Since all the records in the program buffer are exhausted (the begin record PBrecord1 was already checked) comparison stops at this point.

As demonstrated in this example, the program buffer 82 is a subset of the PCB 126 since the test system 120 is allowed to skip samples and records. Also, the program buffer 82 should not contain any records (except for filler or extra records) that are not predicted by the PCB 126.

Referring to FIG. 8, the program buffer 82 is checked again and compared again to the PCB 126 at the second interruption point. At this interruption point, the predicted total number of samples (Count1) is three, and the number of samples collected at the current interruption point (Count2) is two.

A check is made to determine whether the first record (PBrecord1) is a begin record. PBrecord1 is a begin record. A check is then made to determine whether the NRG in the begin record is equal to the predicted total number of samples (Count1). Here, NRG=000003 and Count1=3, so processing continues.

Count2=2 and Count1=3 indicate that there should be two new samples in the program buffer. Since NRG=3, one old sample exists in the program buffer which was already processed at the previous interrupt point. Thus, only the two new samples are processed in this iteration.

Count2=2 means that there are two samples, so there should be two timestamp records ("03 in the first byte) and two instruction records ("04" in the first byte) in the program buffer. Here, "PBrecord5" and "PBrecord9" are timestamp records, and "PBrecord8" and "PBrecord12" are instruction records corresponding to the two new samples.

After the initial checks are completed, the PCB 126 is used to validate all the records stored in the two new samples of the program buffer 82 (i.e., the samples stored between the current interruption point and the previous interruption point. It is noted that the PCB records from the first interruption point have been removed or are at least disregarded, so that the PCB 126 shown in FIG. 8 includes only records predicted for the current interruption point.

"CBrecord2" and "CBrecord3" of the PCB 126 are instruction type records indicating that there should be only two new samples in the program. Also, the number of non-instruction event type records in the PCB is one ("CBrecord1" is a transfer record) which is less than the predetermined number of records to be sourced from the collection buffer (Rcb=2 in this case). This indicates that there should be one filler or extra type record in the program buffer. Here, "PBrecord7" and "PBrecord11" are filler type records.

Comparison of both the buffers commences starting with the last record first, i.e. PBrecord12 of the program buffer 82 and CBrecord3 of the PCB 126. Here, both the records are equal. The buffer pointers are decremented by record size (Rz=16 bytes). Since it is predetermined as shown above that the next record in the program buffer 82 should be filler record, "PBrecord11" is verified and only the program buffer pointer is decremented. Next, CBrecord2 is an instruction type record and hence the PCB pointer alone is decremented by Rz to point to the next record. Now, "PBrecord10" is compared with CBrecord1, which are equal. Both the buffer pointers are decremented by Rz, so that the PCB buffer pointer is at the beginning of the PCB 126 and the program buffer pointer is at PBrecord9. PBrecord9 was previously checked as a timestamp record, so processing continues to the next sample.

For the next sample, the program buffer pointer is at PBrecord8. The PCB pointer is reset to the last minus one, since one sample has already been processed, so the PCB pointer is at CBrecord2. PBrecord8 and CBrecord2 are compared and determined to be equal. Since the next record PBrecord7 is confirmed as a filler record, only the program buffer pointer is decremented. Next, CBrecord1 and PBrecord6 are compared and determined to be equal, and both buffer pointers are decremented. At this stage, the PCB pointer is exhausted. The PBrecord5 of the program buffer 82 was already determined to be a timestamp record, thus the program buffer pointer is decremented and the program buffer is now exhausted. Processing is complete and the program buffer 82 is validated up to the second interruption point.

Similar checks and comparisons may be performed at one or more subsequent interruption points if applicable. It is noted again that the interruption points are only an example of instruction stream points at which program buffer testing can be performed.

As described above, embodiments can be embodied in the form of computer-implemented processes and apparatuses for practicing those processes. An embodiment may include a computer program product 140 as depicted in FIG. 9 on a computer readable/usable medium 142 with computer program code logic 144 containing instructions embodied in tangible media as an article of manufacture. Exemplary articles of manufacture for computer readable/usable medium 142 may include floppy diskettes, CD-ROMs, hard drives, universal serial bus (USB) flash drives, or any other computer-readable storage medium, wherein, when the computer program code logic 144 is loaded into and executed by a computer, the computer becomes an apparatus for practicing the invention. Embodiments include computer program code logic 144, for example, whether stored in a storage medium, loaded into and/or executed by a computer, or transmitted over some transmission medium, such as over electrical wiring or cabling, through fiber optics, or via electromagnetic radiation, wherein, when the computer program code logic 144 is loaded into and executed by a computer, the computer becomes an apparatus for practicing the invention. When implemented on a general-purpose microprocessor, the computer program code logic 1004 segments configure the microprocessor to create specific logic circuits.

Technical effects and benefits include the ability to test and validate run-time instrumentation processes, particularly by providing a system level test of hardware-level runtime instrumentation. The embodiments described herein are able to confirm whether the program buffer contains more records than possible, and are able to validate the program buffer while allowing some percentage of records to be skipped. The embodiments described herein also provide an effective way of testing runtime instrumentation at the system level, using a predicted list of records that may not have one-to-one correspondence with a program buffer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for system-level testing of a run-time instrumentation sampling process, the computer program product comprising:
a non-transitory tangible storage medium readable by a processing circuit and storing instructions for execution by the processing circuit for performing a method comprising:
generating a test instruction stream of a program that includes a plurality of executable instructions;
setting controls for a runtime-instrumentation process, the runtime-instrumentation process configured to sample one or more instructions as the test instruction stream is executed and store records of events corresponding to the one or more sample instructions;
simulating execution of the test instruction stream and sampling of the test instruction stream according to the controls, and storing simulated records associated with the sampling in a predicted collection buffer (PCB);
accessing a program buffer of a processor, the program buffer storing records associated with sampling the test instruction stream according to the controls during execution of the test instruction stream by the processor;
examining individual records in the program buffer to determine whether the individual records are valid and in proper sequence; and
comparing the simulated records of the PCB and the records of the program buffer to validate the program buffer.

2. The computer program product of claim 1, wherein storing records by the instrumentation unit includes storing the records as a reporting group for each sample instruction, the reporting group including at least one of a begin record, a timestamp record, an event record, filler record, an extra record and an instruction record as applicable.

3. The computer program product of claim 2, wherein examining individual records includes:
comparing a number of reporting groups in the program buffer to a number of samples predicted by the simulation; and
comparing a number of predicted instruction records in the PCB and a number of instruction records in the program buffer.

4. The computer program product of claim 2, wherein examining includes checking the begin record at the beginning of the program buffer, and comparing the number of reporting groups indicated by the begin record or time-stamp record at the beginning of the reporting group and instruction record at the end of the reporting group and the number of samples predicted by the simulation.

5. The computer program product of claim 2, wherein comparing includes comparing the last simulated record of the PCB up to a testing point to the last record of the program buffer up to the testing point, and decrementing by record size through each simulated record in the PCB and through each record in the program buffer to determine whether the predicted records match corresponding records in the program buffer in the correct sequence.

6. The computer program product of claim 5, wherein comparing includes confirming whether both the last simulated record and the last program buffer record for each reporting group are matching instruction records.

7. The computer program product of claim 6, wherein simulating includes determining from the simulation a number of non-instruction type event records and a number of filler records or extra records, and comparing includes:
decrementing through any filler records or extra records in the program buffer until a non-instruction type event record is encountered;
decrementing through the PCB until a simulated non-instruction type record is encountered; and
determining whether the non-instruction type event record matches the simulated non-instruction type record.

8. The computer program product of claim 1, further comprising setting at least one testing point in the test instruction stream, wherein the examining and comparing are performed on records in the program buffer that are stored between a current testing point and the beginning of the program buffer or a previous testing point.

9. The computer program product of claim 8, wherein the computer program product has capability to have at least one testing point that is at least one interruption point occurring during execution of the test instruction stream.

10. A computer implemented method for system-level testing of a run-time instrumentation sampling process, the method comprising:
generating a test instruction stream of a program that includes a plurality of instructions configured to be executed by a processor;
setting controls for a runtime-instrumentation process, the runtime-instrumentation process configured to sample one or more instructions as the test instruction stream is executed and store records of events corresponding to the one or more sample instructions;
simulating execution of the test instruction stream and simulating sampling of the test instruction stream according to the controls by a test system, and storing simulated records associated with the simulated sampling in a predicted collection buffer (PCB);
accessing a program buffer of a processor, the program buffer storing records associated with sampling the test instruction stream according to the controls during execution of the test instruction stream by the processor;
examining, by the test system, individual records in the program buffer to determine whether the individual records are valid and in proper sequence; and
comparing, by the test system, the simulated records of the PCB and the records of the program buffer to validate the program buffer.

11. The method of claim 10, wherein the program buffer stores the records as a reporting group for each sample instruction, the reporting group including at least one of a begin record, a timestamp record, an event record, filler record, an extra record and an instruction record as applicable.

12. The method of claim 11, wherein examining individual records includes:
comparing a number of reporting groups in the program buffer to a number of samples predicted by the simulation; and
comparing a number of predicted instruction records in the PCB and a number of instruction records in the program buffer.

13. The method of claim 11, wherein comparing includes comparing the last simulated record of the PCB up to a testing point to the last record of the program buffer up to the testing point, and decrementing by record size through each simulated record in the PCB and through each record in the program buffer to determine whether the predicted records match corresponding records in the program buffer in the correct order.

14. The method of claim 13, wherein comparing includes confirming whether both the last simulated record and the last program buffer record for each reporting group are matching instruction records.

15. The method of claim 14, wherein simulating includes determining from the simulation a number of non-instruction type event records and a number of filler records or extra records, and comparing includes:
- decrementing through any filler records or extra records in the program buffer until a non-instruction type event record is encountered;
- decrementing through the PCB until a simulated non-instruction type record is encountered; and
- determining whether the non-instruction type event record matches the simulated non-instruction type record.

16. A system for system-level testing of a run-time instrumentation sampling process, the system comprising:
- a memory; and
- a processor including a testing unit configured to perform a method comprising:
- generating a test instruction stream of a program that includes a plurality of executable instructions;
- setting controls for a runtime-instrumentation process, the runtime-instrumentation process configured to sample one or more instructions as the test instruction stream is executed and store records of events corresponding to the one or more sample instructions;
- simulating execution of the test instruction stream and sampling of the test instruction stream according to the controls, and storing simulated records associated with the sampling in a predicted collection buffer (PCB);
- accessing a program buffer of a processor, the program buffer storing records associated with sampling the test instruction stream according to the controls during execution of the test instruction stream by the processor;
- examining individual records in the program buffer to determine whether the individual records are valid and in proper sequence; and
- comparing the simulated records of the PCB and the records of the program buffer to validate the program buffer.

17. The system of claim 16, wherein the program buffer stores the records as a reporting group for each sample instruction, the reporting group including at least one of a begin record, a timestamp record, an event record, filler record, an extra record and an instruction record as applicable, and examining individual records includes:
- comparing a number of reporting groups in the program buffer to a number of samples predicted by the simulation; and
- comparing a number of predicted instruction records in the PCB and a number of instruction records in the program buffer.

18. The system of claim 17, wherein comparing includes comparing the last simulated record of the PCB up to a testing point to the last record of the program buffer up to the testing point, and decrementing by record size through each simulated record in the PCB and through each record in the program buffer to determine whether the predicted records match corresponding records in the program buffer.

19. The system of claim 18, wherein simulating includes determining from the simulation an instruction record, a number of non-instruction type event records and a number of filler records or extra records for each reporting group, and comparing includes:
- confirming whether both the last simulated record and the last program buffer record for each reporting group are matching instruction records;
- decrementing through any filler records or extra records in the program buffer until a non-instruction type event record is encountered;
- decrementing through the PCB until a simulated non-instruction type record is encountered; and
- determining whether the non-instruction type event record matches the simulated non-instruction type record.

20. The system of claim 16, wherein the test instruction stream includes at least one of an instruction that enables runtime instrumentation and an instruction that disables runtime instrumentation, and the system is configured to validate records in the program buffer according to whether runtime instrumentation has been enabled.

* * * * *